United States Patent
Tsai

(10) Patent No.: US 12,085,174 B1
(45) Date of Patent: Sep. 10, 2024

(54) BUTTERFLY VALVE

(71) Applicant: Tsung-Yen Tsai, Kaohsiung (TW)

(72) Inventor: Tsung-Yen Tsai, Kaohsiung (TW)

(*) Notice: Subject to any disclaimer, the term of this patent is extended or adjusted under 35 U.S.C. 154(b) by 0 days.

(21) Appl. No.: 18/123,530

(22) Filed: Mar. 20, 2023

(51) Int. Cl.
*F16K 1/22* (2006.01)
*F16K 1/226* (2006.01)
*F16K 31/60* (2006.01)

(52) U.S. Cl.
CPC ............ *F16K 1/221* (2013.01); *F16K 1/2268* (2013.01); *F16K 31/602* (2013.01)

(58) Field of Classification Search
CPC ....... F16K 1/221; F16K 1/2268; F16K 31/602
USPC .................................................. 251/305–308
See application file for complete search history.

(56) References Cited

U.S. PATENT DOCUMENTS

| | | | | |
|---|---|---|---|---|
| 3,127,904 | A * | 4/1964 | Stillwagon ............ | F16K 1/2265 137/454.6 |
| 4,291,863 | A * | 9/1981 | Gachot ................. | F16K 41/026 251/308 |
| 5,294,091 | A * | 3/1994 | van Eck ................ | F16K 31/602 251/173 |
| 9,695,947 | B2 * | 7/2017 | Gutmann ................ | F16K 1/221 |

FOREIGN PATENT DOCUMENTS

TW 196495 4/1992

* cited by examiner

*Primary Examiner* — John Bastianelli
(74) *Attorney, Agent, or Firm* — J.C. PATENTS

(57) ABSTRACT

This invention relates to a butterfly valve, which includes at least a valve body, a valve shaft, a seal member and a valve plate. Said valve body is provided with a first valve shaft hole, and a through hole is provided in the middle position of said valve body. A positioning ring is provided on the upper periphery of said valve shaft, said valve shaft is composed of an upper section, a middle section and a lower section, said upper section and lower section are cylindrical structures, and said middle section is a non-cylindrical structure; the outer diameter of said positioning ring is larger than the outer diameter of said upper section, a sliding washer is mounted on said valve shaft, and said sliding washer is arranged between the groove of said valve body and the positioning ring of said valve shaft; a fastening recess is provided below the lower section of said valve shaft, and a C-shaped buckle is mounted on said fastening recess. said seal member is provided with a second valve shaft hole, the inner side of said second valve shaft hole is provided with at least one annular flange; the inner side of said seal member is provided with a counterbore at the position of said second valve shaft hole, said counterbore is provided with a resistance-reducing element. Said valve plate is provided with a third valve shaft hole, and the shape of said third valve shaft hole corresponds to the shape of said middle section of said valve shaft.

8 Claims, 7 Drawing Sheets

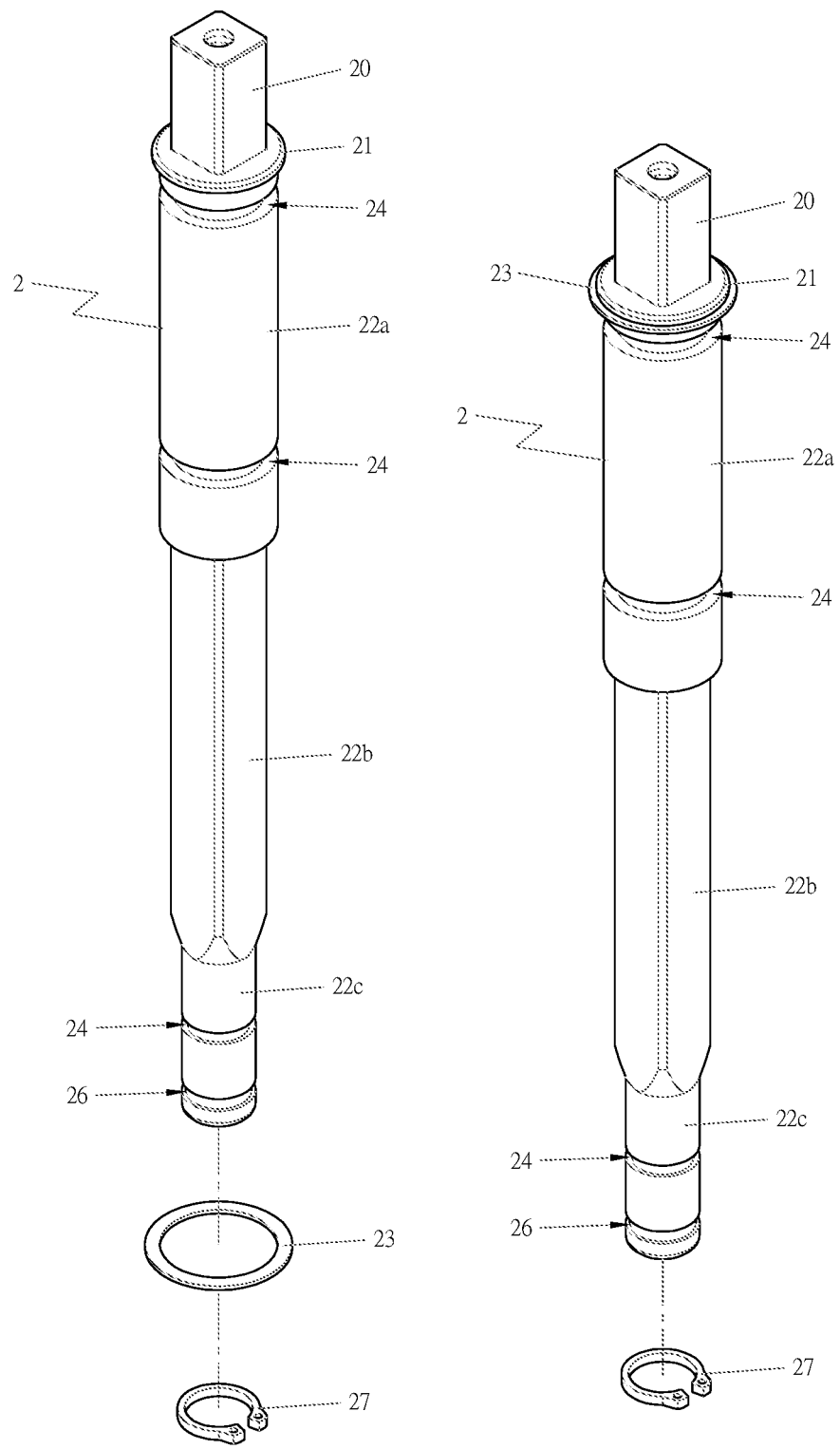

BUTTERFLY VALVE

BACKGROUND OF THE INVENTION

1. Field of the Invention

This invention relates to a butterfly valve applied to fluid pipelines, particularly to an innovative structural that can quickly open and close the valve plate, and can improve the quality and effectiveness of the butterfly valve.

2. Description of the Prior Art

Traditional butterfly valves, such as Taiwan Patent publication No. TW 196495 "Butterfly Valve Shaft Positioning Device", this butterfly valve is provided with a through hole in the center of the valve body and extends to the valve plate. The top surface of the valve body is provided with a recessed portion, an annular frame is arranged below the recessed portion, and a gap is arranged on the outer plate of the annular frame. The two ends of an upper valve shaft are square rods, a pin is inserted into the upper valve shaft, and one end of the pin extends outwards to the outside of the upper valve shaft. The two ends of a lower valve shaft are circular rods, and another pin is inserted into the lower valve shaft.

That is to say, the upper valve shaft, the lower valve shaft and the valve body of the foregoing conventional butterfly valve are positioned and combined through two pins. However, because the pins are unstable, it is easy to fall off during use, causing the valve body, upper valve shaft, lower valve shaft and valve plate to be easily separated. This will seriously affect the quality of the butterfly valve, and will seriously affect the use safety of the fluid pipeline.

Furthermore, rotating the valve disc through the upper valve shaft and the lower valve shaft of the conventional butterfly valve will generate greater resistance, and it is very difficult for the user to rotate the valve disc. When the butterfly valve is closed in an emergency, the user must expend a lot of force to turn on or turn off the valve disc. In addition, as the size of the butterfly valve increases, the resistance it generates increases and the operation becomes more difficult.

This will lead to the risk of the fluid pipeline not being able to close immediately, or the problem that the valve disc is stuck and cannot be used. The user may damage the butterfly valve or cause the handle to break when the user turns the valve shaft too hard, which is not practical.

For this reason, the inventor of this invention researched and improved the quality and safety of the conventional butterfly valve, and hence devised this invention.

SUMMARY OF THE INVENTION

The purpose of the present invention is to provide an innovative butterfly valve structure, the assembly of the butterfly valve is fast and the structure is stable, which can improve the service quality of the butterfly valve. Furthermore, the present invention can reduce the internal resistance of the valve shaft and the valve plate through the innovative resistance reduction technology, so that the valve plate can be opened and closed very smoothly. In this way, the problem that the traditional butterfly valve cannot be opened or closed smoothly and the defect that the valve shaft is easy to fall off can be solved, and the practicability of the butterfly valve can be improved.

To achieve the aforementioned purpose, the butterfly valve of the present invention at least includes a valve body, a valve shaft, a seal member and a valve plate. Said valve body is provided with a first valve shaft hole, and a through hole is provided in the middle position of said valve body. A positioning ring is provided on the upper periphery of said valve shaft, said valve shaft is composed of an upper section, a middle section and a lower section, said upper section and lower section are cylindrical structures, and said middle section is a non-cylindrical structure; the outer diameter of said positioning ring is larger than the outer diameter of said upper section, a sliding washer is mounted on said valve shaft, and said sliding washer is arranged between the groove of said valve body and the positioning ring of said valve shaft; a fastening recess is provided below the lower section of said valve shaft, and a C-shaped buckle is mounted on said fastening recess. said seal member is provided with a second valve shaft hole, the inner side of said second valve shaft hole is provided with at least one annular flange; the inner side of said seal member is provided with a counterbore at the position of said second valve shaft hole, said counterbore is provided with a resistance-reducing element. Said valve plate is provided with a third valve shaft hole at a position corresponding to said first valve shaft hole and second valve shaft hole, and the shape of said third valve shaft hole corresponds to the shape of said middle section of said valve shaft.

The butterfly valve of present invention, among which both sides of said valve body are respectively provided with a first annular groove and a second annular groove, and the inner side of said valve body is provided with a third annular groove; a first flange and a second flange are respectively provided on the inner sides of the two side walls of said recessed portion, and the middle position of said recessed portion is provided with a third flange; the first flange, second flange and third flange of said seal member respectively correspond to the first annular groove, second annular groove and third annular groove of said valve body.

The butterfly valve of present invention, among which Teflon washer is the best choice for said sliding washer, and said resistance-reducing element may be at least one annular flange, a smooth surface or a sliding washer.

BRIEF DESCRIPTION OF DRAWINGS

This invention will be better understood by referring to the accompanying drawings, wherein:

FIG. 3 is a schematic view of the first assembly of the valve shaft of the present invention;

FIG. 4 is a schematic view of the second assembly of the valve shaft of the present invention;

DETAILED DESCRIPTION OF THE PREFERRED EMBODIMENT

The preferred embodiments of the butterfly valve in the present invention, as shown in FIGS. 1 to 11, the butterfly valve includes a valve body 1, a valve shaft 2, a seal member 3 and a valve plate 4 as main components combined together.

Figure 1:
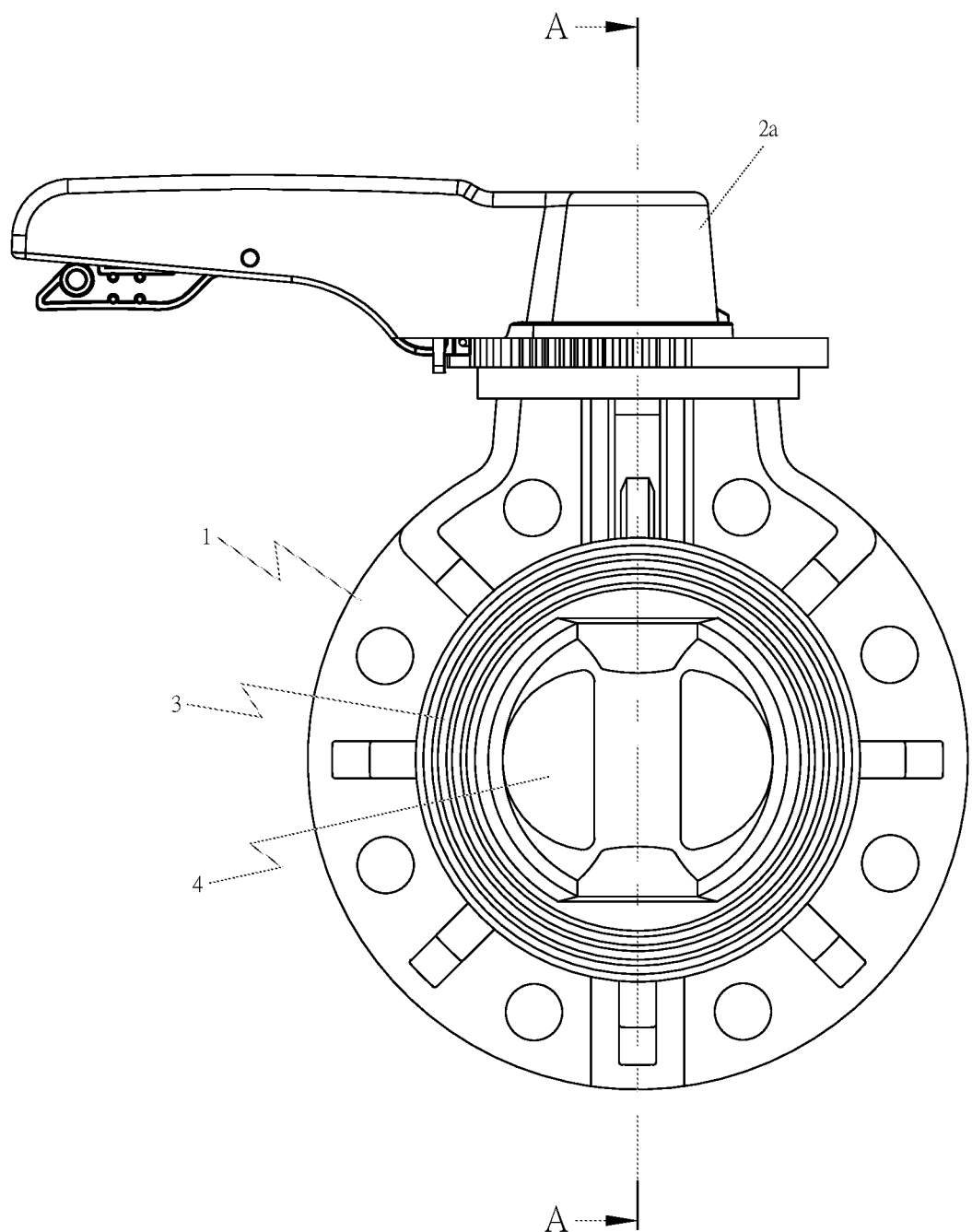
FIG. 1 is a front view of an embodiment of the present invention.
Figure 2:
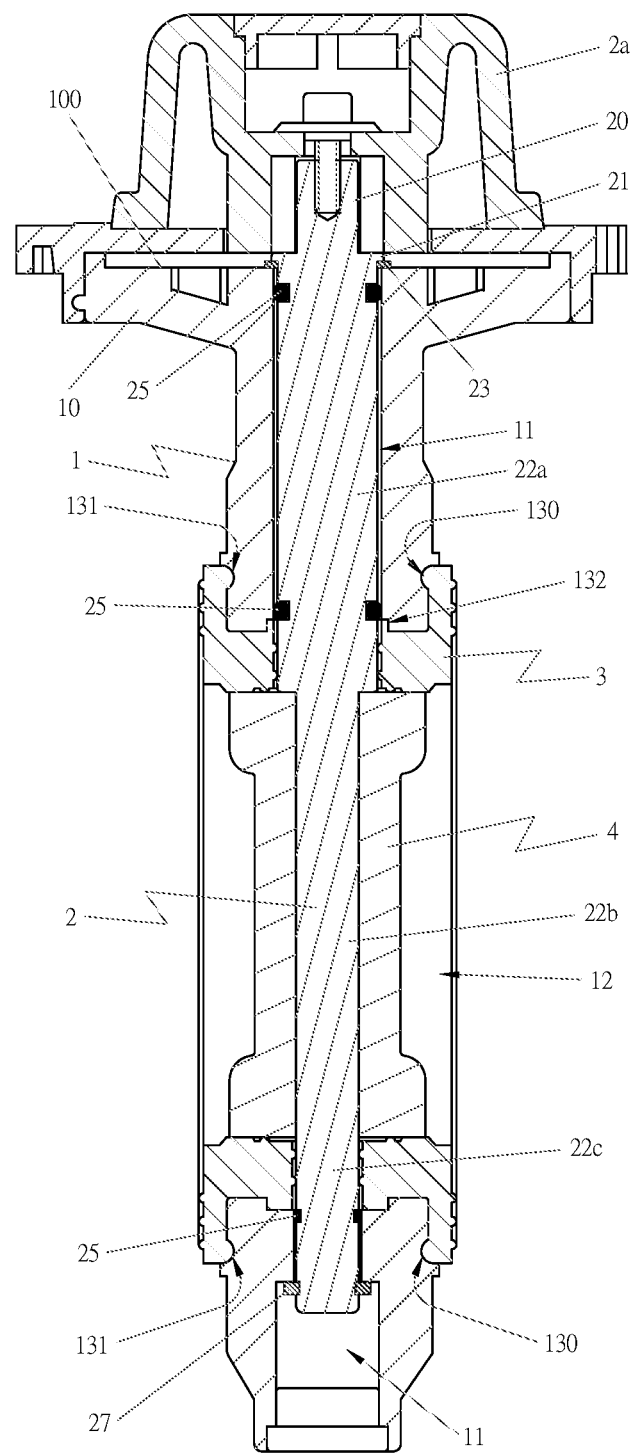
FIG. 2 is a sectional view along A-A of FIG. 1.

As shown in FIGS. 1 and 2, a platform 10 is provided above said valve body 1, and a groove 100 is arranged on the top said platform 10. The middle position of said groove 100 is provided with a first valve shaft hole 11, and said first valve shaft hole 11 goes through the valve body 1 so that said valve shaft 2 can be mounted therein. A through hole 12 is provided in the middle position of said valve body 1, said through hole 12 is connected to said first valve shaft hole 11, so that said valve shaft 2, seal member 3 and valve plate 4 can be mounted therein. Both sides of said valve body 1 are respectively provided with a first annular groove 130 and a second annular groove 131, and the inner side of said valve body 1 is provided with a third annular groove 132. Said first annular groove 130, second annular groove 131 and third annular groove 132 are used to assist in fixing said seal member 3.

Figures 5, 6:
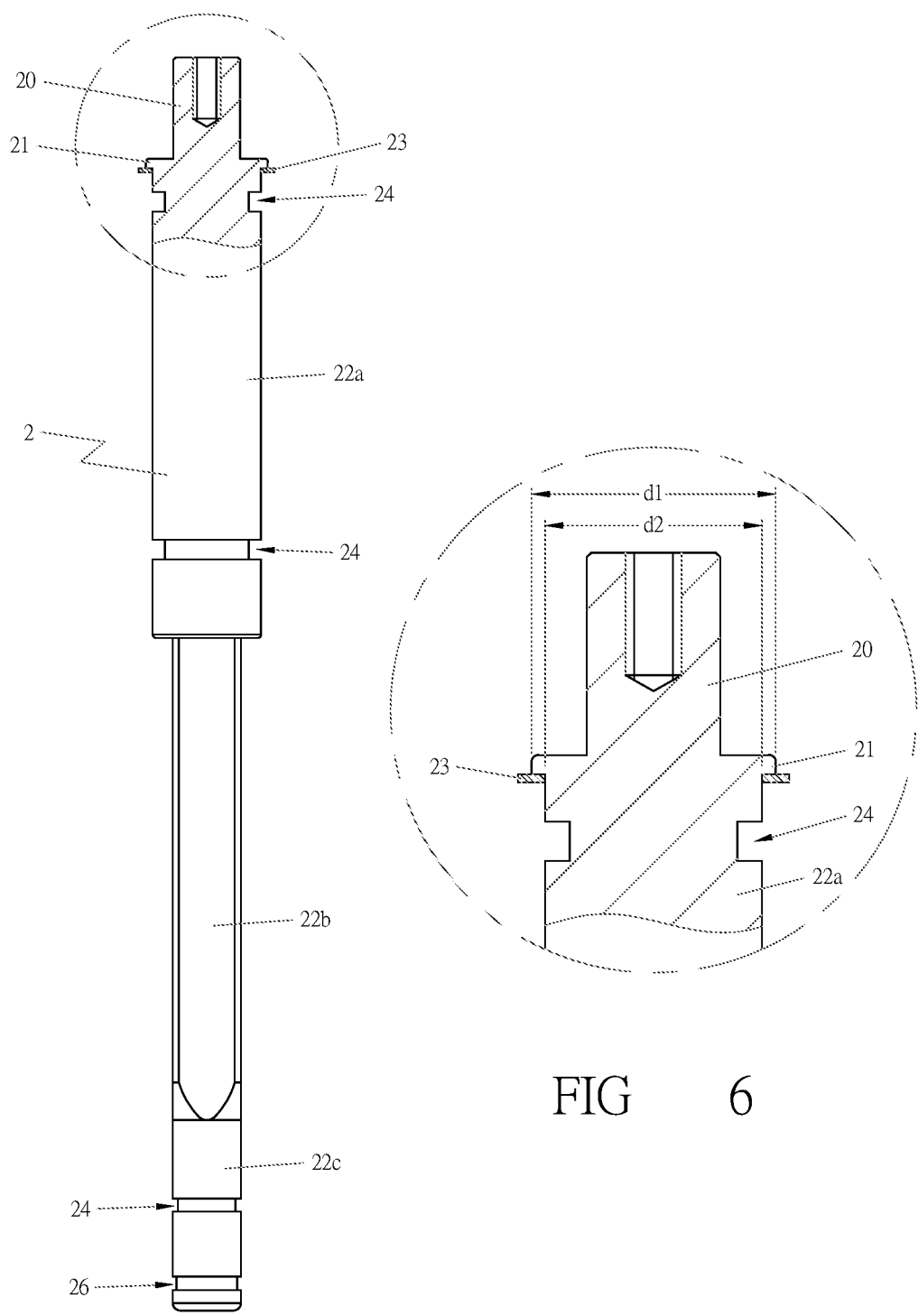
FIG. 5 is a partial sectional view of the valve shaft of the present invention.
FIG. 6 is a partially enlarged view of FIG. 5.
Figure 7:
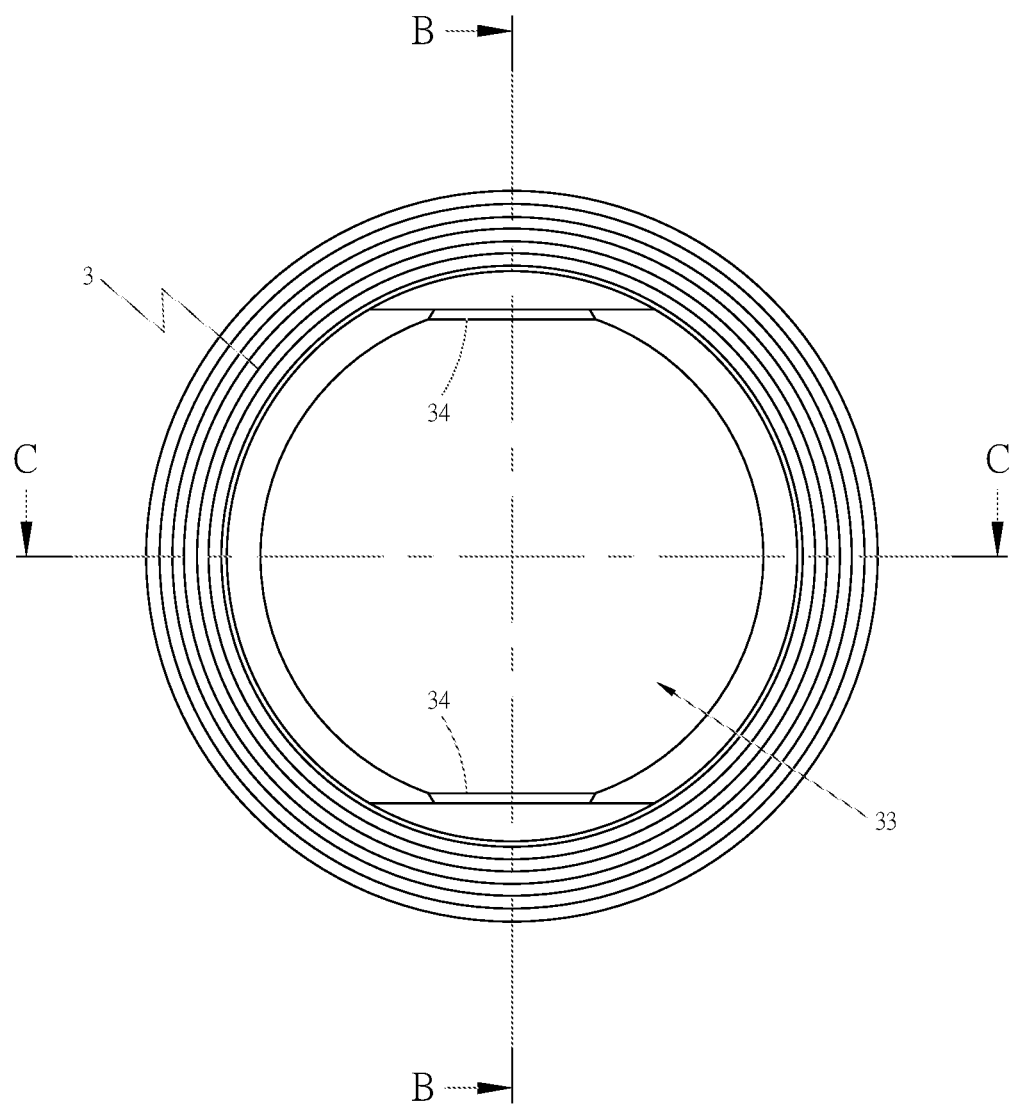
FIG. 7 is a front view of the seal member of the present invention.
Figure 8:
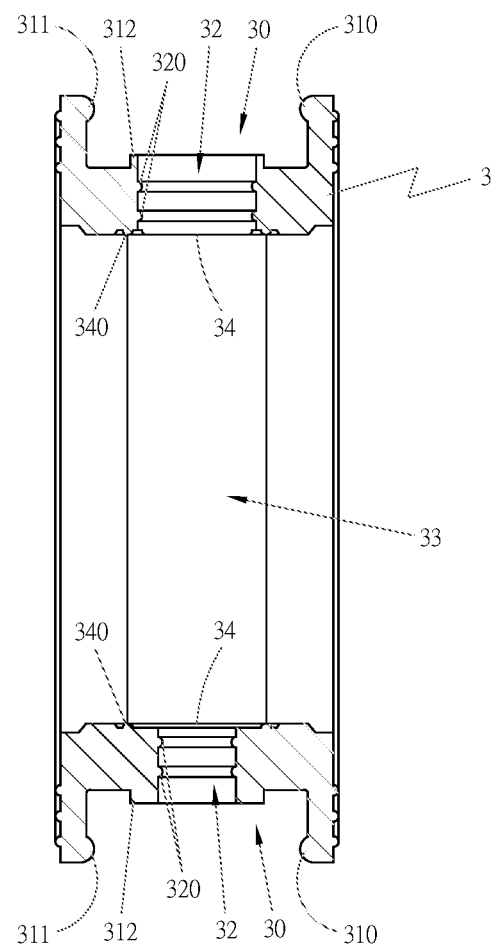
FIG. 8 is a sectional view along B-B of FIG. 7.
Figure 9:
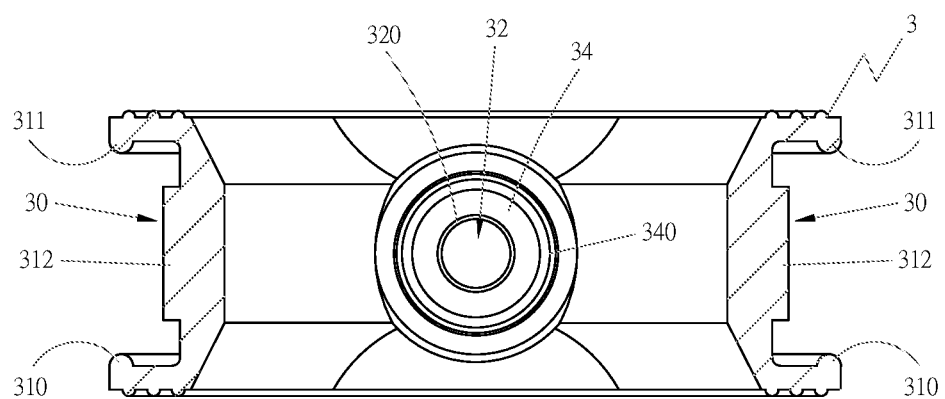
FIG. 9 is a sectional view along C-C of FIG. 7.

As shown in FIGS. 2 to 6, said valve shaft 2 is provided with a joint portion 20, said joint portion 20 is connected with a handle 2a, and said handle 2a is arranged above the platform 10 of said valve body 1, so that said valve shaft 2 can be rotated by said handle 2a. As shown in FIG. 6, a positioning ring 21 is provided on the upper periphery of said valve shaft 2, said valve shaft 2 is composed of an upper section 22a, a middle section 22b and a lower section 22c, said upper section 22a and lower section 22c are cylindrical structures, and said middle section 22b is a non-cylindrical structure (such as a polygon prism structure). The outer diameter d1 of said positioning ring 21 is larger than the outer diameter d2 of said upper section 22a, a sliding washer 23 is mounted on said valve shaft 2, and said sliding washer 23 is arranged between the groove 100 of said valve body 1 and the positioning ring 21 of said valve shaft 2. Said sliding washer 23 may be made of various materials, among which the Teflon washer is the best, which has a very low friction coefficient, and can improve the stability of the rotation of said valve shaft 2 and reduce the rotational resistance of said valve shaft 2. As shown in FIG. 2, when said valve body 1 is combined with said valve shaft 2, said sliding washer 23 is located between said groove 100 and positioning ring 21. In this way, when the user turns said handle 2a, the valve shaft 2 can be rotated smoothly.

Said valve shaft 2 is provided with at least one annular recess 24, and a seal ring 25 is mounted on said annular recess 24. Said seal ring 25 can be a rubber ring, a plastic ring or a silica gel ring, depending on the usage requirements. A fastening recess 26 is provided below the lower section 22c of said valve shaft 2, and a C-shaped buckle 27 is mounted on said fastening recess 26. In addition, said valve shaft 2 may not be provided with an annular recess 24, and a seal ring 25 can be directly mounted on said valve shaft 2, as long as it can prevent the liquid from leaking from the valve shaft 2.

As shown in FIG. 2 and FIGS. 7 to 11, said seal member 3 is mounted on the through hole 12 of said valve body 1, said seal member 3 is an annular structure made of anti-leakage materials such as rubber, plastic or silica gel. A recessed portion 30 is provided above said seal member 3, a first flange 310 and a second flange 311 are respectively provided on the inner sides of the two side walls of said recessed portion 30, and the middle position of said recessed portion 30 is provided with a third flange 312. The first flange 310, second flange 311 and third flange 312 of said seal member 3 respectively correspond to the first annular groove 130, second annular groove 131 and third annular groove of said valve body 1. In this way, the seal member 3 can be stably installed on the through hole 12 of said valve body 1.

Figure 10:
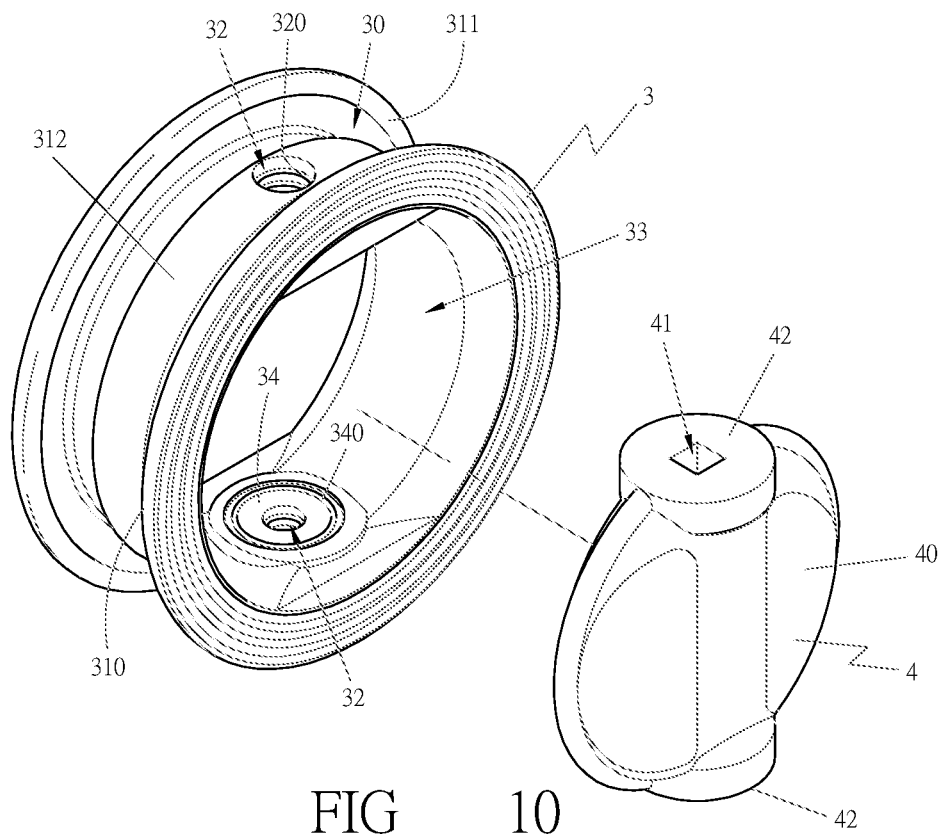
FIG. 10 is the first embodiment of the seal member and the valve plate of the present invention.
Figure 11:
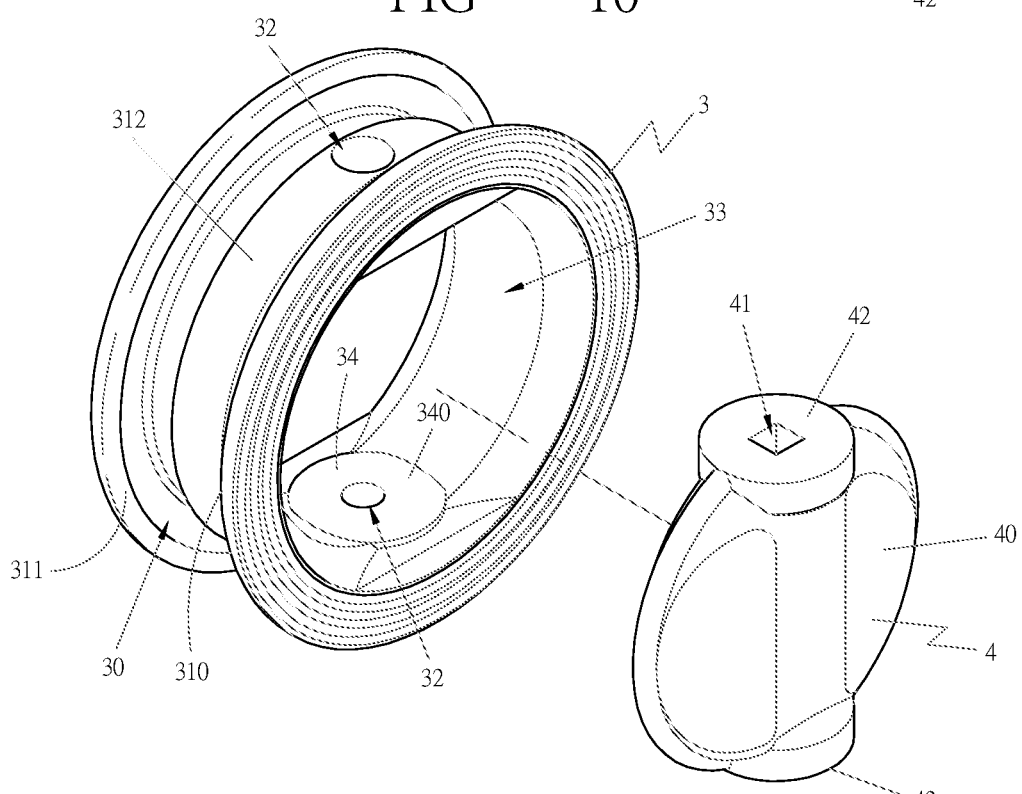
FIG. 11 is the second embodiment of the seal member and the valve plate of the present invention.

As shown in FIGS. 8 to 11, the recessed portion 30 of said seal member 3 is provided with a second valve shaft hole 32 corresponding to the first valve shaft hole 11 of said valve body 1, said second valve shaft hole 32 goes through said seal member 3, so that said valve shaft 2 can be disposed therein. The inner side of said second valve shaft hole 32 is provided with at least one annular flange 320, said annular flange 320 can reduce the rotational contact area between said second valve shaft hole 32 and said valve shaft 2, so as to reduce the frictional resistance of said second valve shaft hole 32 to said valve shaft 2, and allow the rotation of said valve shaft 2 to be more stable and smooth, and there will be no sense of jamming. The inner side of said seal member 3 is provided with a mounting portion 33, said mounting portion 33 is provided with a counterbore 34 at the position of said second valve shaft hole 32, said counterbore 34 is provided with a resistance-reducing element 340, said resistance-reducing element 340 can reduce the frictional resistance of said counterbore 34 to said valve plate 4, and allow the rotation of valve plate 4 to be more stable and smooth, and there will be no sense of jamming. Said resistance-reducing element 340 may be at least one annular flange (as shown in FIG. 10), a smooth surface (as shown in FIG. 11) or a sliding washer (such as a Teflon washer, not shown), as long as the rotation resistance between said valve plate 4 and said seal member 3 can be reduced.

As shown in FIGS. 2, 10 and 11, said valve plate 4 is mounted inside said seal member 3, both sides of said valve plate 4 are provided with wing portion 40. Said valve plate 4 is provided with a third valve shaft hole 41 at a position corresponding to said first valve shaft hole 11 and second valve shaft hole 32, said third valve shaft hole 41 passes through said valve plate 4 so that the valve shaft 2 can be disposed therein. The shape of said third valve shaft hole 41 corresponds to the shape of said middle section 22b of said valve shaft 2. In this way, when said valve shaft 2 rotates, said valve plate 4 can be synchronously driven to rotate. Said valve plate 4 is provided with two connecting portions 42 at both ends of said third valve shaft hole 41, the shape of said connecting portion 42 corresponds to the shape of the counterbore 34 of said seal member 3, so that said valve plate 4 can be stably positioned in said seal member 3, making the assembly of said valve plate 4 more accurate and fast.

When the butterfly valve of the present invention is assembled, the valve plate 4 and the seal member 3 can be combined first, and then the valve plate 4 and the seal member 3 are mounted in the valve body 1. The sliding washer 23 is set from the lower end of the valve shaft 2. The valve shaft 2 can insert into the upper end of the first valve shaft hole 11 of the valve body 1, then passes through the second valve shaft hole 32 of the seal member 3 and the third valve shaft hole 41 of the valve plate 4, and finally protrudes from the lower end of the first valve hole 11 of the valve body 1. At this time, the C-shaped buckle 27 can be fastened to the fastening recess 26 of the valve shaft 2, and then the handle 2a can be installed on the upper end of the valve shaft 2, and the assembly of the butterfly valve can be quickly completed.

When the user opens or closes the valve plate 4 through the handle 2a, the sliding washer 23, annular flange 320 and resistance-reducing element 340 can reduce the internal resistance of the valve shaft 2 and the valve plate 4, so that the valve plate 4 can be opened and closed very smoothly. In this way, the problem of the traditional butterfly valve not opening or closing smoothly and the valve shaft easy falling off can be solved by the present invention.

While the preferred embodiments of this invention have been described above, it will be recognized and understood that various modifications may be made therein and appended claims are intended to cover all such modifications that may fall within the spirit and scope of the invention.

What is claimed is:

1. A butterfly valve at least comprising a valve body, a valve shaft, a seal member and a valve plate;

a platform is provided above said valve body, a groove is arranged on the top said platform, the middle position of said groove is provided with a first valve shaft hole, and said first valve shaft hole goes through said valve body; a through hole is provided in the middle position of said valve body, said through hole is connected to said first valve shaft hole;

said valve shaft is provided with a joint portion, said joint portion is connected with a handle, and said handle is arranged above the platform of said valve body; a positioning ring is provided on the upper periphery of said valve shaft, said valve shaft is composed of an upper section, a middle section and a lower section, said upper section and lower section are cylindrical structures, and said middle section is a non-cylindrical structure; the outer diameter of said positioning ring is larger than the outer diameter of said upper section, a sliding washer is mounted on said valve shaft, and said sliding washer is arranged between the groove of said valve body and the positioning ring of said valve shaft; a fastening recess is provided below the lower section of said valve shaft, and a C-shaped buckle is mounted on said fastening recess;

said seal member is mounted on the through hole of said valve body, said seal member is an annular structure, a recessed portion is provided above said seal member; said recessed portion is provided with a second valve shaft hole corresponding to the first valve shaft hole of said valve body, said second valve shaft hole goes through said seal member, the inner side of said second valve shaft hole is provided with at least one annular flange, said annular flange can reduce the rotational contact area between said second valve shaft hole and said valve shaft, so as to reduce the frictional resistance of said second valve shaft hole to said valve shaft; the inner side of said seal member is provided with a mounting portion, said mounting portion is provided with a counterbore at the position of said second valve shaft hole, said counterbore is provided with a resistance-reducing element, said resistance-reducing element reduce the frictional resistance of said counterbore to said valve plate;

said valve plate is mounted inside said seal member, both sides of said valve plate are provided with wing portion, said valve plate is provided with a third valve shaft hole at a position corresponding to said first valve shaft hole and second valve shaft hole, said third valve shaft hole passes through said valve plate, and the shape of said third valve shaft hole corresponds to the shape of said middle section of said valve shaft; said valve plate is provided with two connecting portions at both ends of said third valve shaft hole, the shape of said connecting portion corresponds to the shape of the counterbore of said seal member.

2. The butterfly valve according to claim 1, wherein both sides of said valve body are respectively provided with a first annular groove and a second annular groove, and the inner side of said valve body is provided with a third annular groove; a first flange and a second flange are respectively provided on the inner sides of the two side walls of said recessed portion, and the middle position of said recessed portion is provided with a third flange; the first flange, second flange and third flange of said seal member respectively correspond to the first annular groove, second annular groove and third annular groove of said valve body.

3. The butterfly valve according to claim 1, wherein said sliding washer is Teflon washer.

4. The butterfly valve according to claim 1, wherein said valve shaft is provided with at least one annular recess, and a seal ring is mounted on said annular recess.

5. The butterfly valve according to claim 1, wherein said valve shaft is provided with at least one seal ring.

6. The butterfly valve according to claim 1, wherein said resistance-reducing element is an annular flange.

7. The butterfly valve according to claim 1, wherein said resistance-reducing element is a smooth surface.

8. The butterfly valve according to claim 1, wherein said resistance-reducing element is a sliding washer.

* * * * *